United States Patent
Neff et al.

(10) Patent No.: US 9,085,495 B2
(45) Date of Patent: *Jul. 21, 2015

(54) ENCAPSULATED PARTICLE

(75) Inventors: Raymond Neff, Northville, MI (US); Alexander Gershanovich, Beverly Hills, MI (US); Donald C. Mente, Gross Ile, MI (US); Rajesh Kumar, Riverview, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,375

(22) PCT Filed: May 4, 2012

(86) PCT No.: PCT/US2012/036563
§ 371 (c)(1),
(2), (4) Date: Nov. 4, 2013

(87) PCT Pub. No.: WO2012/151506
PCT Pub. Date: Nov. 8, 2012

(65) Prior Publication Data
US 2014/0060133 A1  Mar. 6, 2014

Related U.S. Application Data

(60) Provisional application No. 61/482,959, filed on May 5, 2011.

(51) Int. Cl.
*C05C 9/00* (2006.01)
*C05G 3/00* (2006.01)

(52) U.S. Cl.
CPC .......... *C05G 3/0088* (2013.01); *C05C 9/00* (2013.01); *C05G 3/0029* (2013.01); *C05G 3/0035* (2013.01)

(58) Field of Classification Search
None
See application file for complete search history.

(56) References Cited

U.S. PATENT DOCUMENTS

| | | | |
|---|---|---|---|
| 3,450,562 A | 6/1969 | Hoeschele | |
| 4,052,347 A | 10/1977 | Dieterich et al. | |
| 4,252,919 A | 2/1981 | Wagner et al. | |
| 4,263,181 A | 4/1981 | Wagner et al. | |
| 4,283,219 A | 8/1981 | Wagner et al. | |
| 4,341,650 A | 7/1982 | Wagner et al. | |
| 4,396,733 A | 8/1983 | Wagner et al. | |
| 4,428,983 A | 1/1984 | Nehen et al. | |
| 4,711,659 A | 12/1987 | Moore | |
| 5,108,653 A | 4/1992 | Taylor | |
| 5,538,531 A * | 7/1996 | Hudson et al. | 71/28 |
| 5,645,624 A | 7/1997 | Naka et al. | |
| 5,968,222 A | 10/1999 | Kodali | |
| 6,001,147 A * | 12/1999 | Markusch et al. | 71/64.07 |
| 6,107,448 A | 8/2000 | Sakamoto et al. | |
| 6,152,981 A * | 11/2000 | Markusch et al. | 71/1 |
| 6,322,606 B1 * | 11/2001 | Komoriya et al. | 71/11 |
| 6,358,296 B1 * | 3/2002 | Markusch et al. | 71/64.07 |
| 6,364,925 B1 * | 4/2002 | Markusch et al. | 71/64.07 |
| 6,395,824 B1 | 5/2002 | Beutler et al. | |
| 6,503,288 B1 * | 1/2003 | Markusch | 71/64.07 |
| 6,509,440 B1 | 1/2003 | Sakane et al. | |
| 6,555,645 B1 | 4/2003 | Ikeda et al. | |
| 7,258,921 B2 | 8/2007 | Hashiba et al. | |
| 7,416,785 B2 | 8/2008 | Mente | |
| 2003/0089150 A1 * | 5/2003 | Markusch et al. | 71/1 |
| 2003/0224936 A1 | 12/2003 | Kretzschmar | |
| 2004/0180044 A1 | 9/2004 | Chao et al. | |
| 2005/0076687 A1 | 4/2005 | Whittington | |
| 2006/0094851 A1 | 5/2006 | Audenaert et al. | |
| 2008/0103265 A1 | 5/2008 | Schocker et al. | |
| 2009/0004441 A1 | 1/2009 | Haberle et al. | |
| 2009/0143542 A1 | 6/2009 | Savino et al. | |
| 2010/0326152 A1 * | 12/2010 | Mente | 71/27 |

FOREIGN PATENT DOCUMENTS

| | | |
|---|---|---|
| CN | 1246840 A | 3/2000 |
| CN | 1675290 A | 9/2005 |
| CN | 1956938 A | 5/2007 |
| CN | 101056700 A | 10/2007 |
| CN | 101948348 A | 1/2011 |
| DE | 19733044 A1 | 2/1999 |
| EP | 0142242 A1 | 5/1985 |
| EP | 1172347 A2 | 1/2002 |
| EP | 2256142 A1 | 12/2010 |
| WO | WO 99/06459 A1 | 2/1999 |

(Continued)

OTHER PUBLICATIONS

English language abstract and machine translation for DE19733044 extracted from espacenet.com database on Apr. 23, 2014, 40 pages.
English language abstract for WO99/06459 extracted from espacenet.com database on Apr. 23, 2014, 43 pages.
International Search Report for PCT/US2012/036563, dated Jul. 31, 2012, 4 pages.
International Search Report for PCT/US2012/036603, dated Jul. 31, 2012, 4 pages.
English language abstract for CN 101056700 extracted from espacenet.com database on Dec. 29, 2014, 1 page.
English language abstract for CN 101948348 extracted from espacenet.com database on Dec. 29, 2014, 1 page.

(Continued)

*Primary Examiner* — Wayne Langel
(74) *Attorney, Agent, or Firm* — Howard & Howard Attorneys PLLC

(57) ABSTRACT

An encapsulated particle including a core particle, a base layer, and an outer layer is provided. The base layer is disposed about the core particle and comprises polycarbodiimide. The outer layer is disposed about the base layer and comprises wax. A method of forming the encapsulated particle including the steps of reacting an isocyanate in the presence of a catalyst to form the polycarbodiimide, encapsulating the core particle with the polycarbodiimide to form the base layer, and encapsulating the base layer with the wax to form the outer layer is also provided.

20 Claims, No Drawings

(56) References Cited

FOREIGN PATENT DOCUMENTS

| WO | WO 2010/149713 A1 | 12/2010 |
| WO | WO 2012/151530 A1 | 11/2012 |

OTHER PUBLICATIONS

English language abstract for CN 1246840 extracted from espacenet.com database on Jan. 5, 2015, 1 page.
English language abstract for CN 1956938 extracted from espacenet.com database on Jan. 5, 2015, 1 page.

* cited by examiner

ENCAPSULATED PARTICLE

RELATED APPLICATIONS

This application is the National Stage of International Patent Application No. PCT/US2012/036563, filed on May 4, 2012, which claims priority to and all the advantages of U.S. Provisional Patent Application No. 61/482,959, filed on May 5, 2011, the content of which is incorporated herein by reference.

BACKGROUND OF THE INVENTION

1. Field of the Invention

The subject invention generally relates to an encapsulated. More specifically, the subject invention relates to an encapsulated particle that includes a core particle, a base layer, and an outer layer.

2. Description of the Related Art

Encapsulated particles, such as controlled-release fertilizers are known in the agricultural art. Such encapsulated particles typically include one or more layers disposed about a core particle comprising a fertilizer such as urea. Thickness and integrity of the layers limit dissolution rate of the encapsulated particles, specifically, a rate that the core particle releases the core particle, e.g. a "payload", into soil that includes moisture.

Unfortunately, many conventional encapsulated particles include inconsistent thickness of the one or more layers, which results in accelerated dissolution rates. As known in the agricultural art, such accelerated dissolution rates lead to waste and phytotoxicity, i.e., toxic effect of the fertilizer on plant growth. Further, many conventional encapsulated particles have layers with integrity problems, since the layers include defects, such as cracks, pits, depressions, etc. When a layer including such defects is disposed about the core particle, the cracks, pits, and/or depressions allow water and other liquids to permeate the layers, thus prematurely contacting and dissolving the core particle. To cure such defects, multiple layers of substantial thickness must typically be disposed about the core particle resulting in a time consuming and expensive manufacturing process for forming the encapsulated particle. Still further, depending on the composition of the one or more layers, many conventional encapsulated particles are prone to breakage and other performance issues, due to the layers lacking adequate hardness and durability over a range of temperatures and environmental conditions. Such breakage reduces shelf life of the encapsulated particles, and results in waste during storage, handling, and use of the encapsulated particles.

Accordingly, there remains an opportunity to provide an encapsulated particle with improved moisture resistance, improved swelling resistance, and improved hardness and durability over a range of temperatures and environmental conditions. There also remains an opportunity to provide an encapsulated particle with extended and more predictable dissolution rates and an opportunity to provide an efficient and effective method of forming such an encapsulated particle.

SUMMARY OF THE INVENTION AND ADVANTAGES

An encapsulated particle includes a core particle, a base layer, and an outer layer. The base layer is disposed about the core particle and comprises polycarbodiimide. The outer layer is disposed about the base layer and comprises wax.

A method of forming the encapsulated particle includes the steps of reacting an isocyanate in the presence of a catalyst to form the polycarbodiimide, encapsulating the core particle with the polycarbodiimide to form the base layer, and encapsulating the base layer with the wax to form the outer layer. Further, a system for producing an encapsulated particle includes the core particle, the isocyanate, the catalyst, and the wax.

The encapsulated particle is particularly effective because the base layer comprising polycarbodiimide and the outer layer comprising wax resist the rapid release of the core particle and provide a controlled release, e.g., dissolution, of the core particle. The polycarbodiimide imparts properties such as hydrophobicity, thermally stability, abrasion resistance, and durability to the base layer. The outer layer comprising wax works in conjunction with the base layer to promote more complete encapsulation of core particle and thus minimize the amounts of the base layer required to achieve excellent controlled release properties. Further, the method of forming the encapsulated particle also promotes a more complete encapsulation of the core particle and formation of the base and outer layers having consistent thickness and minimal defects.

DETAILED DESCRIPTION OF A PREFERRED EMBODIMENT

The instant invention provides an encapsulated particle, a method of forming the encapsulated particle, and a system for producing the encapsulated particle. The encapsulated particle includes a core particle, a base layer disposed about the core particle, and an outer layer disposed about the base layer. The core particle typically includes a fertilizer that may include calcium, magnesium, nitrogen, phosphate, potassium, sulfur, and combinations thereof. The fertilizer may be selected from the group of nitrogenous fertilizers, phosphoric fertilizers, potash fertilizers, sulfuric fertilizers, and combinations thereof, e.g. mixed fertilizers. Suitable fertilizers include, but are not limited to, anhydrous ammonia, urea, ammonium nitrate, urea ammonium nitrate, potassium nitrate, calcium ammonium nitrate, calcium phosphate, phosphoric acid, monoammonium phosphate, ammonium polyphosphate, ammonium phosphate sulfate, potash, ammonium nitrate, potassium nitrate, potassium chloride, potassium sulfate, ammonium sulfate and sulfuric acid, and combinations thereof. Typical non-limiting examples of fertilizer include urea and monoammonium phosphate.

The core particle may also include components other than fertilizers. Such other components include, but are not limited to, herbicides, insecticides, fungicides, and other components for use in agricultural applications. However, the encapsulated particle is not limited for use in agricultural applications and the core particle of the present invention is not limited to the fertilizer or other components described immediately above.

Although the shape of the core particle is not critical, core particles having a spherical shape are preferred. Accordingly, the core particle is typically either round or roughly spherical. Although the core particle may be of any size, the core particle typically has a particle size of from No. 170 to 5/16 in., more typically from No. 35 to No. 3½, and most typically from No. 18 to No. 5 mesh, as measured in accordance with standard sizing techniques using the United States Sieve Series. That is, the core particle typically has a particle size of from 0.1 to 7, more typically from 0.5 to 5, and most typically from 1 to 4, mm. Core particles which are round or roughly spherical and have such particle sizes typically allow lower amounts of the layers to be used and typically allow the layers to be disposed about the core particle with increased uniformity and completeness as compared to core particles having other particle sizes.

As used herein, the terminology "disposed about" encompasses the layers being disposed about the core particle and also encompasses both partial and complete covering of the core particle by the layers. The layers are disposed about the core particle to an extent sufficient to form an encapsulated particle that can be effectively used in controlled release applications. As such, any given sample of the encapsulated particle typically includes core particles having the layers disposed thereon, and the layers are typically disposed about a large enough surface area of each individual core particle so that release of the core particle can be effectively controlled.

Typically, the layers are disposed about at least 75, more typically about at least 95, and most typically about at least 99, % of the core particle. Said differently, the core particle may be partially or totally encapsulated by the layers.

Referring back, the base layer comprises polycarbodiimide. Typically, the base layer is formed from the reaction of an isocyanate in the presence of a catalyst. That is, the base layer typically comprises polycarbodiimide that is the reaction product of the isocyanate in the presence of the catalyst. The base layer can be the reaction product of one type of isocyanate. Alternatively, the base layer can be the reaction product of at least two different isocyanates such that the isocyanate introduced above is defined as a first isocyanate and a second isocyanate that is different from the first isocyanate. Obviously, the base layer comprising polycarbodiimide may be the reaction product of more than two isocyanates.

The isocyanate may be any type of isocyanate known to those skilled in the art. The isocyanate may be a polyisocyanate having two or more functional groups, e.g. two or more NCO functional groups. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the base layer include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate; 2,4,6-toluoylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4, 6-triisocyanate; 1-ethyl-3,5-diisopropyl benzene-2,4,6-triisocyanate and 1,3,5-triisopropyl benzene-2,4,6-triisocyanate. Other suitable base layers can also be prepared from aromatic diisocyanates or isocyanates having one or two aryl, alkyl, aralkyl or alkoxy substituents wherein at least one of these substituents has at least two carbon atoms. Specific examples of suitable isocyanates include LUPRANATE® L5120, LUPRANATE® MM103, LUPRANATE® M, LUPRANATE® ME, LUPRANATE® MI, LUPRANATE® M20, and LUPRANATE® M70, all commercially available from BASF Corporation of Florham Park, N.J.

For example, the isocyanate used to form the base layer can comprise LUPRANATE® M20, LUPRANATE® M, and combinations thereof. LUPRANATE® M20 has an NCO content of about 31.5 weight percent and LUPRANATE® M has an NCO content of about 33.5 weight percent. In one embodiment, the isocyanate comprises polymeric diphenylmethane diisocyanate having an NCO content of about 31.5 weight percent and/or 4,4'-diphenylmethane diisocyanate having an NCO content of about 33.5 weight percent.

As indicated above, multiple isocyanates may be reacted to form the base layer. When one or more isocyanates are reacted to form the base layer, the physical properties of the base layer, such as hardness, strength, durability, creep, brittleness, thermal stability, and environmental resistance can be further optimized and balanced.

In one embodiment the first isocyanate is further defined as a polymeric isocyanate, and the second isocyanate is further defined as a monomeric isocyanate. As such, a mixture of LUPRANATE® M20 and LUPRANATE® M may be reacted to form the base layer. LUPRANATE® M20 comprises polymeric isocyanates, such as polymeric diphenyl methane diisocyanate, and also comprises monomeric isocyanates. LUPRANATE® M comprises only monomeric isocyanates. As is known in the art, a monomeric isocyanate includes, but is not limited to, 2,4'-diphenylmethane diisocyanate (2,4'-MDI) and 4,4'-diphenylmethane diisocyanate (4,4'-MDI). As is also well know in the art, polymeric isocyanate includes isocyanates with two or more aromatic rings.

Increasing an amount of LUPRANATE® M20 in the mixture increases the amount of polymeric MDI in the mixture, and increasing the amount of polymeric MDI in the mixture affects the physical properties of the base layer. For example, in one embodiment, a mixture of LUPRANATE® M20 and LUPRANATE® M is reacted to form the base layer. Generally, increasing an amount of LUPRANATE® M20 and decreasing an amount of LUPRANATE® M in the mixture forms a base layer which is harder, stronger, and does not creep significantly; however, the base layer may also be brittle. Likewise, decreasing the amount of LUPRANATE® M20 and increasing the amount of LUPRANATE® M in the mixture generally decreases the brittleness but increases the creep of the base layer.

In the embodiment where the first isocyanate is further defined as a polymeric isocyanate, and the second isocyanate is further defined as a monomeric isocyanate, the polymeric isocyanate, such as LUPRANATE® M20, is typically reacted in an amount of from 20 to 100, more typically from 40 to 80, most typically from 60 to 70, percent by weight and the monomeric isocyanate, such as LUPRANATE® M, is typically reacted in an amount of from 20 to 80, more typically from 25 to 60, most typically from 30 to 40, percent by weight, both based on a total combined weight of the polymeric and monomeric isocyanates. The polymeric isocyanate and the monomeric isocyanate of this embodiment typically react in a weight ratio of 4:1 to 1:4, more typically 2.5:1 to 1:1, and even more typically 2.0:1, to form the base layer.

The one or more isocyanates are typically heated in the presence of the catalyst to form the base layer. That is, the base layer comprises polycarbodiimide that is the reaction product of the isocyanates in the presence of the catalyst. The one or more isocyanates are typically heated in the presence of the catalyst to form the base layer. The catalyst may be any type of catalyst known to those skilled in the art. Generally, the catalyst is selected from the group of phosphorous compounds, tertiary amides, basic metal compounds, carboxylic acid metal salts, non-basic organo-metallic compounds, and combinations thereof. For example, the one or more isocyanates may be heated in the presence of a phosphorous compound to form the base layer. Suitable, non-limiting examples of the phosphorous compound include phosphates such as triethyl phosphate (TEP), which is represented by the following structure:

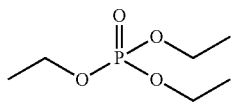

Other suitable, non limiting examples of the phosphorous compound include, but are not limited to, phospholene oxides such as 3-methyl-1-phenyl-2-phospholene oxide (MPPO), 1-phenyl¬ -2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO). One particularly suitable phospholene oxide is MPPO, represented by the following structure:

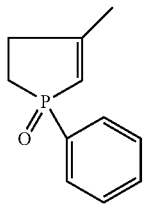

Another particularly suitable phospholene oxide is MEPO, represented by the following structure:

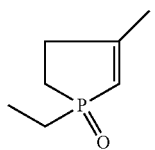

The catalyst may be present in any amount sufficient to catalyze the reaction between the isocyanates. Typically, the catalyst is present in the polycarbodiimide in an amount of greater than 0.01, more typically of from 0.5 to 10, still more typically of from 1 to 5, and most typically of from 1.0 to 4, percent by weight based on 100 percent by weight of the isocyanates.

In a preferred embodiment, 3-methyl-1-phenyl-2-phospholene oxide is typically present in the polycarbodiimide in an amount of greater than 0.01, more typically of from 0.5 to 10, still more typically of from 1 to 5, and most typically of from 1.0 to 4, percent by weight based on 100 percent by weight of the isocyanates.

In one embodiment, MPPO and TEP are utilized in a weight ratio of from 1:10 to 10:1, more typically from 1:5 to 3:1, and most typically from 1:3 to 1:1. In another embodiment, MPPO and dipropylene glycol are utilized in a weight ratio of from 1:10 to 10:1, more typically from 1:5 to 3:1, and most typically from 1:3 to 1:1.

Specific base layers which are suitable for the purposes of the subject invention include, but are not limited to, monomers, oligomers, and polymers of diisopropylcarbodiimide, dicyclohexylcabodiimide, methyl-tert-butylcarbodiimide, 2,6-diethylphenyl carbodiimide; di-ortho-tolyl-carbodimide; 2,2'-dimethyl diphenyl carbodiimide; 2,2'-diisopropyl-diphenyl carbodiimide; 2-dodecyl-2'-n-propyl-diphenylcarbodiimide; 2,2'-diethoxy-diphenyl dichloro-diphenylcarbodiimide; 2,2'-ditolyl-diphenyl carbodiimide; 2,2'-dibenzyl-diphenyl carbodiimide; 2,2'-dinitro-diphenyl carbodiimide; 2-ethyl-2'-isopropyl-diphenyl carbodiimide; 2,6,2',6'-tetraethyl-diphenyl carbodiimide; 2,6,2',6'-tetrasecondary-butyl-diphenyl carbodiimide; 2,6,2',6'-tetraethyl-3,3-dichloro-diphenyl carbodiimide; 2-ethyl-cyclohexyl-2-isopropylphenyl carbodiimide; 2,4,6,2',4',6'-hexaisopropyl-diphenyl carbodiimide; 2,2'-diethyl-dicyclohexyl carbodiimide; 2,6,2',6'-tetraisopropyl-dicyclohexyl carbodiimide; 2,6,2',6'tetraethyl-dicyclohexy) carbodiimide and 2,2'-dichlorodicyclohexyl carbodiimide; 2,2'-dicarbethoxy diphenyl carbodiimide; 2,2'-dicyano-diphenyl carbodiimide and the like.

Typically, the isocyanate is reacted in an amount of from 0.1 to 10, more typically from 0.5 to 7.5, and most typically from 1 to 3.5, parts by weight based on 100 parts by weight of the core particle to form the base layer comprising polycarbodiimide. The amount of isocyanate reacted to form the base layer may vary outside of the ranges above, but is typically both whole and fractional values within those ranges. Further, the base layer is typically present in the encapsulated particle in an amount of from 0.1 to 10, more typically of from 0.5 to 7.5, and most typically of from 1 to 3.5, parts by weight based on 100 parts by weight of the core particle. The amount of base layer present in the encapsulated particle may vary outside of the ranges above, but is typically both whole and fractional values within those ranges.

The base layer comprising polycarbodiimide may be formed in-situ where the base layer comprising polycarbodiimide is disposed about the core particle during formation of the base layer comprising polycarbodiimide Said differently, the components of the base layer comprising polycarbodiimide, e.g., the isocyanate and the catalyst, may be combined with the core particle and the base layer comprising polycarbodiimide forms and is disposed about the core particle simultaneously.

However, in one embodiment a polycarbodiimide is formed and some time later applied to, e.g. mixed with, the core particle and exposed to temperatures exceeding 100° C. to encapsulate the core particle. Advantageously, this embodiment allows the polycarbodiimide to be formed at a location designed to handle chemicals, under the control of personnel experienced in handling chemicals. Once formed, the polycarbodiimide can be transported to another location, applied to the core particle, and heated. Other advantages of this embodiment include quicker coating cycle times, less generation of $CO_2$ during application of the core particle, and reduced use of the catalyst. In addition to the advantages described above, there are numerous logistical and practical advantages associated with this embodiment. For example, if the polycarbodiimide is being applied to the core particle, e.g. fertilizer, the base layer comprising polycarbodiimide may be applied immediately following the manufacturing of the fertilizer thereby simplifying the manufacturing process.

In this embodiment, the isocyanate is mixed with the catalyst to form a reaction mixture. Particularly suitable isocyanates include, but are not limited to, LUPRANATE® M20, LUPRANATE® M, and mixtures thereof. A particularly suitable catalyst is 3-methyl-1-phenyl-2-phospholene oxide. The reaction mixture is heated and a polycarbodiimide is formed. A reaction time of the reaction mixture depends on a temperature at which the reaction mixture is held, pressure, and an amount of catalyst in the reaction mixture. As the reaction time progresses, the formation of the polycarbodiimide proceeds and a molecular weight and a viscosity of the polycarbodiimide increases. After the reaction time, a mixture of the polycarbodiimide, additional isocyanate, and catalyst, in a molten state, is cooled. This mixture solidifies at ambient temperature. Typically, the mixture comprising polycarbodiimide, the isocyanate, and the catalyst, now in a solidified, crystalline state, is processed into various sizes and/or powderized. The mixture comprising polycarbodiimide, the isocyanate, and the catalyst, now a thermoplastic-like solid may be applied to the core particle. The mixture comprising polycarbodiimide, the isocyanate, and the catalyst is applied to the core particle, e.g. mixed with the core particle, and heated for a predetermined amount of time at a temperature greater than 120° F., to form the base layer comprising polycarbodiimide.

As indicated above, the base layer comprising polycarbodiimide is typically formed by reacting an isocyanate, or isocyanates, in the presence of a catalyst. However, it is to be understood that the base layer comprising polycarbodiimide can be formed from other reactants which are not isocyanates. As just one example, the base layer comprising polycarbodiimide of this invention can be formed with ureas, e.g. thioureas, as reactants. Other examples of reactants suitable for formation of polycarbodiimide are described in "Chemistry and Technology of Carbodiimides", Henri Ulrich, John Wiley &Sons, Ltd., Chichester, West Sussex, England (2007), the disclosure of which is hereby incorporated by reference in its entirety.

The encapsulated particle may also include an intermediate layer disposed between the base layer and the outer layer and comprising polycarbodiimide. If included, the intermediate layer is typically formed from the components, e.g., the isocyanate and the catalyst, from the amounts, and with the embodiments, just as described above for the base layer. However, the intermediate layer is not necessarily identical to the base layer. Said differently, the base layer can comprise one polycarbodiimide and the intermediate layer can comprise a different polycarbodiimide, i.e., a polycarbodiimide formed from different components and/or from a different method than those used to form the polycarbodiimide of the base layer. Alternatively, the base layer and the intermediate layer can comprise the same polycarbodiimide, i.e., a polycarbodiimide formed from identical components and from an identical method to those used to form the polycarbodiimide of the base layer.

For example, like the base layer, the intermediate layer typically comprises the reaction product of the isocyanate in the presence of the catalyst. The isocyanate is reacted in an amount of from 0.1 to 10, more typically from 0.5 to 7.5, and most typically from 1 to 3.5, parts by weight based on 100 parts by weight of the core particle to form the intermediate layer comprising polycarbodiimide. The amount of isocyanate reacted to form the intermediate layer may vary outside of the ranges above, but is typically both whole and fractional values within those ranges. Further, the intermediate layer is typically present in the encapsulated particle in an amount of from 0.1 to 10, more typically of from 0.5 to 7.5, and most typically of from 1 to 3.5, parts by weight based on 100 parts by weight of the core particle. If present in the encapsulated particle, the amount of intermediate layer present in the encapsulated particle may vary outside of the ranges above, but is typically both whole and fractional values within those ranges.

In one embodiment, the encapsulated particle includes a base layer and an intermediate layer. In this embodiment, the base layer and the intermediate layer are each present in an amount of from 0.5 to 3.5 parts by weight based on 100 parts by weight of the core particle.

In addition to the base layer, the encapsulated particle also includes an outer layer comprising wax. The outer layer typically comprises a petroleum wax and typically comprises one or more waxes, e.g., a blend of waxes. The outer layer is disposed about the core particle. More specifically, the outer layer is typically disposed about the base layer or, if included, the intermediate layer, which is disposed about the core particle. The outer layer is typically present in the encapsulated particle in an amount of from 0.1 to 5, more typically from 0.3 to 4, and most typically from 0.5 to 3, parts by weight based on 100 parts by weight of the core particle. The amount of the outer layer present in the encapsulated particle may vary outside of the ranges above, but is typically both whole and fractional values within those ranges. A specific, non-limiting example of a suitable wax is EVACOTE® 7089A, commercially available from The International Group, Inc. of Toronto, Calif.

In a typical embodiment, the encapsulated particle includes the base, the intermediate layer, and the outer layer collectively present in an amount of from 0.3 to 7 parts by weight based on 100 parts by weight of the core particle. For example, in one embodiment, the encapsulated particle includes (1) a base layer present in an amount of about 3 parts by weight based on 100 parts by weight of the core particle, (2) an intermediate layer present in an amount of about 3 parts by weight based on 100 parts by weight of the core particle, and (3) the outer layer present in an amount of about 1 part by weight based on 100 parts by weight of the core particle.

The encapsulated particle and the layers thereof may also include a surfactant such as a silicone surfactant. The silicone surfactant includes silicon and is typically a polyorganosiloxane. A non-limiting example of a typical polyorganosiloxane is an alkyl pendant organosilicone molecule comprising a polysiloxane backbone and polyether side chains. The alkyl pendant organosilicone molecule of this example can be comb structured or dendrimer structured.

The silicone surfactant typically improves the wetting of the components of the layers, such as the base layer, on the core particle and, accordingly, may also be described as a wetting agent. The silicone surfactant also typically improves the adhesion of the layers to the other layers and the core particle. In addition, the silicone surfactant reduces clumping and agglomeration of the encapsulated particle during and after the encapsulation process. As such, the silicone surfactant promotes more complete encapsulation of the core particle by the layers, promotes consistent thickness of the layers, allows for formation of the layers having minimal but consistent thickness, reduces the amount of material collectively required to encapsulate the core particles with the layers, and minimizes pits and depressions in the layers.

Typically, the silicone surfactant is a liquid and has a viscosity of from 100 to 1500, more typically from 200 to 1000, and most typically from 650 to 850 cSt at 25° C. The viscosity of the silicone surfactant may vary outside of the ranges above, but is typically both whole and fractional values within those ranges.

Specific examples of suitable silicone surfactants include, but are not limited to, TEGOSTAB® BF 2370, commercially available from Goldschmidt AG of Essen, Del., DABCO® DC5043 commercially available from Air Products and Chemicals, Inc. of Allentown, Pa., and NIAX® Silicone L-5340 and L-620, both commercially available from Momentive Performance Materials of Albany, N.Y. A particularly suitable silicone surfactant is NIAX® Silicone L-620, a polyalkyleneoxidemethylsiloxane copolymer. If included, the silicone surfactant may be included in an amount of from 0.01 to 10, typically from 0.05 to 5, and more typically from 0.1 to 3, parts by weight based on 100 parts by weight of the layer. The parts by weight silicone surfactant may vary outside of the ranges above, but is typically both whole and fractional values within those ranges.

The encapsulated particle and layers thereof may also include one or more additives. Suitable additives for purposes of the present invention include, but are not limited to, chain-extenders, cross-linkers, chain-terminators, processing additives, adhesion promoters, anti-oxidants, defoamers, flame retardants, catalysts, anti-foaming agents, water scavengers, molecular sieves, fumed silicas, surfactants, ultraviolet light stabilizers, fillers, thixotropic agents, silicones, colorants, pigments, inert diluents, and combinations thereof. For example, a pigment can be included in the layers. If included, the additives may be included in the encapsulated particle in various amounts.

The encapsulated particle, including the core particle, the base layer, and the outer layer formed thereon is typically either round or roughly spherical. The encapsulated particles typically have a size distribution reported as D[4,3], d(0.1), d(0.5), and/or d(0.9), as well defined and appreciated in the art. In several embodiments, the encapsulated particles have a size distribution D[4,3] of from 0.5 to 5 mm, of from 1 to 4 mm, or of from 1 to 3 mm, with an overall particle size range of from 0.1 to 10 mm. In other embodiments, the encapsulated particles have a size distribution d(0.1) of from 0.2 to 2 mm, of from 0.4 to 1.7 mm, or of from 0.5 to 1.5 mm, with an overall particle size range of from 0.1 to 10 mm. In further embodiments, the encapsulated particles have a size distribution d(0.5) of from 0.5 to 5 mm, of from 1 to 4 mm, or of from 1 to 3 mm, with an overall particle size range of from 0.1 to 10 mm. In still other embodiments, the encapsulated particles have a size distribution d(0.9) of from 0.7 to 7 mm, of from 0.8 to 5 mm, or of from 1 to 4 mm, with an overall particle size range of from 0.1 to 10 mm. The D[4,3], d(0.1), d(0.5), and d(0.9) size distributions of the encapsulated particles may vary outside of the ranges above, but are typically both whole and fractional values within 0.5 to 5 mm, 0.2 to 2 mm, 0.5 to 5 mm, and 0.7 to 7 mm, respectively.

The layers of the encapsulated particle impact dissolution rate of the core particle. Dissolution rate is the rate at which the core particle, typically urea, dissolves in water. To calculate the dissolution rate, dissolution (%) is determined. More specifically, dissolution (%) is determined using the test procedure described immediately below. Dissolution is measured by placing 50 g of the encapsulated particle in a 250 mL plastic bottle. Then 230 g of deionized water is added to the bottle. The plastic bottle is allowed to stand undisturbed for 8 hours at room temperature (23° C.). A liquid sample is then drawn, and its refractive index is measured using a refractometer. An amount (in grams) of the core particle dissolved in each solution sample is calculated using the refractive index and a temperature-corrected standard curve. The amount of the core particle dissolved is utilized to calculate dissolution (%) with the following formula:

$$\text{Dissolution}(\%) = X/(50 - (\text{Weight Percent Applied Layers}/2))$$

X=the amount of core particle (grams) dissolved in the solution sample.

Weight Percent Applied Layers=100%×Weight of Applied Layers/Weight of Encapsulated Particle Dissolution rate is determined with a graphical depiction of dissolution (%) at 1, 3, and 7, days, of the core particle.

Typically, the core particle of the encapsulated particle has a dissolution (%) of less than 90, more typically less than 50, and most typically less than 25, % by weight after 7 days of aging in a water solution at 38° C.

Dissolution (%) can also be determined after the encapsulated particle is abraded to test the durability of the layers formed thereon. To abrade a sample of the encapsulated particle, the encapsulated particle is poured through a pipe. More specifically, the sample of the encapsulated particle weighing 75 grams is poured into a top end of the pipe which is 6' long and 6" in diameter and positioned vertically. The sample is collected at a bottom end of the pipe. The sample is poured through the pipe 5 times. After abrasion, the dissolution (%) of the core particle is tested to determine whether the dissolution (%) changed following abrasion as described immediately above. After abrasion, the core particle of the encapsulated particle typically has a dissolution (%) of less than 90, more typically less than 50, and most typically less than 25, % by weight after 7 days of aging in a water solution at 38° C.

In addition to the encapsulated particle, the subject invention relates to a system for producing the encapsulated particle and a method of method of forming the encapsulated particle. The system for producing the encapsulated particle includes the core particle, the isocyanate, the catalyst, and the wax.

The method of forming the encapsulated particle includes the steps of reacting the isocyanate in the presence of the catalyst to form the polycarbodiimide, encapsulating the core particle with the polycarbodiimide to form the base layer, and encapsulating the base layer with the wax to form the outer layer. As with all other components which may be used in the method of the subject invention (e.g. the core particle), the isocyanate, the catalyst, the wax, etc. are just as described above with respect to the base layer, the intermediate layer, and the outer layer.

As described above, the method includes the step of reacting the isocyanate in the presence of the catalyst to form the polycarbodiimide Typically, the isocyanate and the catalyst are mixed and the isocyanate chemically reacts to form the polycarbodiimide. Further, the step of reacting the isocyanate in the presence of the catalyst to form the polycarbodiimide typically includes heating the isocyanate in the presence of the catalyst to a reaction temperature of greater than 120 and more typically greater than 150° F.

As described above, the method of forming the encapsulated also includes the step of encapsulating the core particle with the polycarbodiimide to form the base layer. The step of reacting the isocyanate and the catalyst to form the polycarbodiimide can be conducted prior to the step of encapsulating the core particle with the polycarbodiimide to form the base layer. Alternatively, the step of reacting the isocyanate and the catalyst to form the polycarbodiimide can be conducted simultaneous with the step of encapsulating the core particle with the polycarbodiimide to form the base layer. That is, the isocyanate, the catalyst and the core particle can be mixed together all at once. In this method, the steps of reacting an isocyanate in the presence of a catalyst to form a polycarbodiimide and encapsulating the core particle with the polycarbodiimide to form the base layer are typically collectively conducted in 40 minutes or less, typically in 30 minutes or less, and more typically in 20 minutes or less.

Typically, the isocyanate, the catalyst, and the other optional components, such as the silicone surfactant, are applied to the core particle in a mechanical mixer including, but not limited to, a ribbon blender, a plough blender, a processing mixer, an impingement mixer, a rotating drum mixer, and combinations thereof. It is to be appreciated that the technique of mixing may include adding components to the vessel sequentially or concurrently. Also, the components may be added to the vessel at various time intervals and/or temperatures.

The method optionally includes the step of heating the core particle prior to the step of encapsulating the core particle with the polycarbodiimide to form the base layer. The core particle may be heated in the reaction vessel or in any container to a temperature typically greater than 120 and more typically greater than 150° F. prior to or simultaneous with the step of encapsulating the core particle with the polycarbodiimide to form the base layer. A preferred temperature range for heating the core particle is from 150 to 180° F. Heating the core particle facilitates the reaction of the components to form the base and intermediate layers.

Further, once the core particle is encapsulated with the polycarbodiimide, the method also optionally includes the step of heating and/or agitating the core particle having the polycarbodiimide applied thereon to further polymerize any unreacted isocyanate as well as the polycarbodiimide. The core particle having the polycarbodiimide applied thereon can be heated and agitated simultaneously. If heated, the core particle having the polycarbodiimide applied thereon may be heated in the reaction vessel or in any container to a temperature typically greater than about 120 and more typically greater than 150° F. If heated, the core particle having the polycarbodiimide applied thereon is typically heated for a time of from 0.5 to 180, more typically from 2 to 120, and most typically from 5 to 60, minutes. If agitated, the step of agitating the core particle having the polycarbodiimide applied thereon may be agitated with techniques including, but not limited to, stirring, mixing, shaking, and combinations thereof. If agitated, the encapsulated particle is typically agitated for a time of from 0.5 to 180, more typically from 2 to 120, and most typically from 5 to 60, minutes. Of course, the steps of heating and/or agitating the core particle having the polycarbodiimide applied thereon can be repeated.

As described above, the encapsulated particle can include the intermediate layer. If included, the intermediate layer is typically formed from the components, e.g., the isocyanate and the catalyst, from the amounts, and with the embodiments, just as described above for the base layer. As such, a supplemental isocyanate can be reacted in the presence of a supplemental catalyst to form a supplemental polycarbodiimide. The base layer can be encapsulated with the supplemental polycarbodiimide to form the intermediate layer disposed about the base layer. In one embodiment, the step of reacting the supplemental isocyanate in the presence of the supplemental catalyst to form the supplemental polycarbodiimide is conducted simultaneously with the step of encapsulating the core particle with the supplemental polycarbodiimide to form the intermediate layer. Alternatively, in another embodiment, the step of reacting the supplemental isocyanate in the presence of the supplemental catalyst to form the supplemental polycarbodiimide can be conducted prior to the step of encapsulating the core particle with the supplemental polycarbodiimide to form the intermediate layer. In this method, the steps of reacting the supplemental isocyanate in the presence of the supplemental catalyst to form the supplemental polycarbodiimide and encapsulating the base layer with the supplemental polycarbodiimide to form the intermediate layer are typically collectively conducted in 40 minutes or less, typically in 30 minutes or less, and more typically in 20 minutes or less.

The method also includes the step of encapsulating the base layer with the wax to form the outer layer. The wax can be applied with various application techniques known in the art including, but not limited to, pouring, pan coating, fluidized-bed coating, co-extrusion, mixing, spraying spinning disk encapsulation. The outer layer can be applied to the core particle such that the outer layer is disposed about the core particle and the base layer is disposed about the wax layer. However, the outer layer is typically applied to either the base layer or the intermediate layer such that the outer layer is the outermost layer. Further, the wax can be applied with any of the layers included in the encapsulated particle. Accordingly, the step of encapsulating the core particle with the outer layer can be conducted prior to, simultaneous with, or after the step of encapsulating the core particle with the polycarbodiimide to form either the base or the intermediate layers, but is most typically conducted after the step of encapsulating the core particle with the polycarbodiimide to form the base layer, or if the encapsulated particle includes an intermediate layer, after the step of encapsulating the core particle with the polycarbodiimide to form the intermediate layer.

The instant invention also provides a dust suppressing aggregate comprising the core particle and a dust suppressing agent disposed about the core particle and comprising polycarbodiimide for suppressing dusting of said core particle. Advantageously, the dust suppressing agent forms a durable layer disposed about the core particle which provides mechanical integrity to the core particle to reduce the dust formed therefrom.

The core particle is just as described above. Further, the dust suppressing agent is typically formed from the components, e.g., the isocyanates and the catalysts described above, and with the embodiments described above, for the base layer of the encapsulated particle.

For example, like the base layer, the dust suppressing agent typically comprises the reaction product of the isocyanate in the presence of the catalyst. However, the dust suppressing agent is typically employed in lower amounts than the base layer to inhibit dust formation but not inhibit release of the core particle. Typically, the isocyanate is reacted in an amount of from 0.1 to 7.5, more typically from 0.3 to 5, and most typically from 0.5 to 2.5, parts by weight based on 100 parts by weight of the core particle to form the dust suppressing agent comprising polycarbodiimide. The amount of isocyanate reacted to form the dust suppressing agent may vary outside of the ranges above, but is typically both whole and fractional values within those ranges. Further, the dust suppressing agent is typically present in the dust suppressing aggregate in an amount of from 0.1 to 7.5, more typically of from 0.3 to 5, and most typically of from 0.5 to 2.5, parts by weight based on 100 parts by weight of the core particle. If present in the dust suppressing aggregate, the amount of dust suppressing agent present in the dust suppressing aggregate may vary outside of the ranges above, but is typically both whole and fractional values within those ranges.

The dust suppressing aggregate can be encapsulated by one or more layers of the dust suppressing agent. Further, the dust suppressing aggregate can include additional layers, for example a layer comprising wax (like the outer layer described above) or a layer comprising polyurethane. Further, the dust suppressing agent can be used in combination with dust suppressing agents known in the art, such as liquid dust suppressing agents. Typically, the dust suppressing aggregate is encapsulated by a single layer of the dust suppressing agent.

In addition to the dust suppressing aggregate, the subject invention relates to a method of forming the dust suppressing aggregate comprising a core particle and a dust suppressing agent disposed about the core particle for suppressing dusting of the core particle. The method of forming the dust suppressing aggregate includes the steps of reacting the isocyanate in the presence of the catalyst to form the polycarbodiimide and encapsulating the core particle with the polycarbodiimide to form the dust suppressing agent. As stated previously, the dust suppressing agent is typically formed from the components, e.g., the isocyanates and the catalysts described above, and with the embodiments and method described above, for the base layer.

The method optionally includes the step of heating the core particle prior to the step of encapsulating the core particle with the polycarbodiimide to form the dust suppressing agent. The core particle may be heated in a reaction vessel or in any container to a temperature typically greater than 120 and more typically greater than 150° F. prior to or simultaneous with the step of encapsulating the core particle with the polycarbodiimide to form the dust suppressing agent. A preferred temperature range for heating the core particle is from 150 to 180° F. Heating the core particle facilitates the reaction of the components to form the dust suppressing agent.

The method also optionally includes the step of heating at least one of the isocyanate and the catalyst prior to the step of encapsulating the core particle with the polycarbodiimide to form the dust suppressing agent. If heated, at least one of the isocyanate and the catalyst can be heated to a temperature typically greater than 120 and more typically greater than 150° F. Heating at least one of the isocyanate and the catalyst facilitates the reaction of the components to form the dust suppressing agent. To this end, the step of reacting the isocyanate in the presence of the catalyst to form the polycarbodiimide may include heating the isocyanate in the presence of the catalyst to a reaction temperature of typically greater than 120 and more typically greater than 150° F.

The step of reacting the isocyanate and the catalyst to form the polycarbodiimide can be conducted prior to the step of encapsulating the core particle with the polycarbodiimide to form the dust suppressing agent. Alternatively, the step of reacting the isocyanate and the catalyst to form the polycarbodiimide can be conducted simultaneous with the step of encapsulating the core particle with the polycarbodiimide to form the dust suppressing agent. That is, the isocyanate, the catalyst and the core particle can be mixed together all at once. In one embodiment, at least one of the isocyanate and the catalyst are spray applied onto the core particle. The isocyanate and the catalyst can be spray applied sequentially or simultaneously. In this method, the steps of reacting the isocyanate in the presence of a catalyst to form a polycarbodiimide and encapsulating the core particle with the polycarbodiimide to form the dust suppressing agent are typically collectively conducted in 40 minutes or less, typically in 30 minutes or less, and more typically in 20 minutes or less.

In one embodiment, the dust suppressing aggregate is formed as described immediately below. To start, the core particle comprising Mosaic MES-Z (a fertilizer commercially available from Mosaic of Plymouth, Minn.), the isocyanate comprising LUPRANATE® M20, and the catalyst comprising a solution of 50 weight percent dipropylene glycol and 50 weight percent 3-methyl-1-phenyl phospholine oxide, is pre-heated to a temperature of 180° F. The pre-heated core particle, in an amount of 2 kg., is added to a 5 gallon pail. The pail, having the core particle therein is rotated at 26 rpm. The isocyanate and the catalyst are sequentially added to the rotating pail using a paint sprayer with air assist. More specifically, the catalyst is added over a period of 30 seconds, once the catalyst is added, the pail is rotated for an additional 2 minutes. The isocyanate is then added over a period of 60 seconds and once the isocyanate is added, the pail is rotated for an additional 10 minutes. After the pail is rotated for 10 minutes, the dust suppressing aggregate, including the dust suppressing agent comprising polycarbodiimide disposed about core particle, is non-tacky, free flowing, and particulate in form.

The following examples illustrate the nature of the invention and are not to be construed as limiting of the invention. Unless otherwise indicated, all parts are given as parts by weight.

EXAMPLES

Encapsulated Particles 1-8 and Comparative Encapsulated Particles 1 and 2 are described herein. Encapsulated Particles 1-8 are encapsulated particles formed in accordance with the present invention. Comparative Encapsulated Particles 1 and 2 are encapsulated particles not formed in accordance with the present invention and are included for comparative purposes.

Encapsulated Particles 1-8 include at least one polycarbodiimide layer disposed about a core particle. The resin compositions used to form the polycarbodiimide layers of Encapsulated Particles 1-8 are set forth below in Table 1. All amounts in Table 1 are in parts by weight based on 100 parts by weight resin composition unless otherwise indicated.

TABLE 1

|  | Ex. 1 | Ex. 2 | Ex. 3 | Comp. Ex. 1 |
|---|---|---|---|---|
| Isocyanate | 98.2 | 97.3 | 96.4 | 37.6 |
| Catalyst | 1.8 | 2.7 | 3.6 | — |
| Polyol A | — | — | — | 15.6 |
| Polyol B | — | — | — | 46.8 |
| Total | 100.0 | 100.0 | 100.0 | 100.0 |

Isocyanate is LUPRANATE® M20, a polymeric isocyanate commercially available from BASF Corporation of Florham Park, N.J.

Catalyst is a solution comprising 63 parts by weight triethyl phosphate and 37 parts by weight 3-methyl-1-phenyl-2-phospholene oxide, based on 100 parts by weight of the solution.

Polyol A is PLURACOL® 1168, an aromatic amine-initiated polyol commercially available from BASF Corporation of Florham Park, N.J.

Polyol B is castor oil.

To form Encapsulated Particles 1-8, at least one polycarbodiimide layer is disposed about a Core Particle comprising urea. The compositions used to form the polycarbodiimide layers of Encapsulated Particles 1-8 are set forth above in Table 1. A resin composition is prepared by mixing, in a first container, one or more isocyanates and a catalyst, as set forth in Table 1 above. Additionally, 200 grams of Core Particle are preheated to a temperature of 80° C. (176° F.) in a reaction vessel. The resin composition, in the first container, is added to the reaction vessel and the resin composition and the preheated Core Particle are mixed with a tongue depressor until the resin composition uniformly wets out, i.e., coats, the Core Particle. The reaction vessel, including the Core Particle and the resin composition, is heated for 5 minutes in an oven set at a temperature of 80° C. (150° F.) After 5 minutes, the reaction vessel is removed from the oven and the Core Particle having the resin composition coated thereon is mixed for 2 minutes with a tongue depressor. The steps of (1) heating the reaction vessel in an oven for 5 minutes and (2) removing the reaction vessel from the oven and mixing the Core Particle having the resin composition coated thereon for 2 minutes are repeated until the resin composition cures to form an encapsulated particle comprising a base layer comprising polycarbodiimide disposed about Core Particle which is non-tacky, free flowing, and particulate in form.

Encapsulated Particles 1-8 are formed in accordance with layers and amounts set forth below in Table 2. Depending on the particular example, the application process described in the proceeding paragraph is simply repeated to form the intermediate layer and/or outer layer in accordance with the descriptions of Encapsulated Particles 1-8 set forth in Table 2.

Once formed, Encapsulated Particles 1-8 and Comparative Encapsulated Particles 1 and 2 are evaluated to determine performance properties, including dissolution (%). The results of the evaluations are also set forth below in Table 2.

Dissolution (%) is determined using the test procedure described immediately below. Initially, 50 g of coated urea particles and 235 g of water are poured into a 250 mL widemouth plastic bottle (bottle) to form a solution. The bottle is placed into an oven set at 38° C. A solution sample is taken from the bottle after 1, 3, and 7 days of aging at 38° C. The refractive index of each solution sample is measured using a refractometer. An amount (in grams) of urea dissolved in each solution sample is calculated using the refractive index reading and a temperature-corrected standard curve. The amount of urea dissolved is utilized to calculate dissolution (%) (percent urea dissolved) with the following formula:

$$\text{Dissolution}(\%) = X/(50 - (\% \text{ Layer}/2))$$

X=the amount of urea (grams) dissolved in the solution sample.
% Layer=100%×Weight of Applied Layer/Weight of Coated Urea

TABLE 2

| Encapsulated Particle | Catalyst (parts by weight based on 100 parts by weight coating) | Base Layer (parts by weight based on 100 parts by weight core particle/PBW) | Intermediate Layer (parts by weight based on 100 parts by weight core particle/PBW) | Outer Layer (parts by weight based on 100 parts by weight core particle/PBW) | Dissolution (%) (7 days at 38° C.) |
|---|---|---|---|---|---|
| Encapsulated Particle 1 | 1.85 | Example 1 1 PBW | Example 1 1 PBW | — | 97 |
| Encapsulated Particle 2 | 1.85 | Example 1 1 PBW | Example 1 1 PBW | WAX A 1PBW | 48 |
| Encapsulated Particle 3 | 3.7 | Example 2 3 PBW | — | — | 97 |
| Encapsulated Particle 4 | 3.7 | Example 2 3 PBW | — | Wax A 1 PBW | 100 |
| Encapsulated Particle 5 | 2.8 | Example 3 3 PBW | — | — | 100 |
| Encapsulated Particle 6 | 2.8 | Example 3 3 PBW | — | Wax A 1 PBW | 76 |
| Encapsulated Particle 7 | 2.8 | Example 3 3 PBW | Example 3 3 PBW | — | 70 |
| Encapsulated Particle 8 | 2.8 | Example 3 3 PBW | Example 3 3 PBW | WAX A 1PBW | 25 |
| Comparative Encapsulated Particle 1 | — | Comp. Ex. 1 6 PBW | — | — | 79 |
| Comparative Encapsulated Particle 2 | — | Comp. Ex. 1 6 PBW | — | WAX A 1 PBW | 35 |

Wax A is EVACOTE® 7089, a wax blend comprising petroleum wax commercially available from The International Group of Toronto, Calif.

Core Particle is urea.

Referring now to Table 2, Comparative Encapsulated Particle 1, which includes a base layer comprising polyurethane, present in an amount of 6 parts by weight, has a dissolution of 79%. In contrast, Encapsulated Particle 7, which includes a base and an intermediate layer comprising polycarbodiimide, each present in an amount of 3 parts by weight, has a dissolution of 70%. As such, Encapsulated Particle 7 comprising two polycarbodiimide layers collectively present in an amount of 6 parts by weight exhibits better dissolution than Comparative Encapsulated Particle 1, which has a single polyurethane layer present in an amount of 6 parts by weight.

Still referring to Table 2, Comparative Encapsulated Particle 2, which includes a base layer comprising polyurethane, present in an amount of 6 parts by weight, and an outer layer comprising wax, has a dissolution of 35%. In contrast, Encapsulated Particle 8, which includes a base and an intermediate layer comprising polycarbodiimide, each present in an amount of 3 parts by weight, and an outer layer comprising wax, has a dissolution of 25%. As such, Encapsulated Particle 8 exhibits better dissolution than Comparative Encapsulated Particle 2.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. An encapsulated particle comprising:
    A. a core particle;
    B. a base layer disposed about said core particle and comprising polycarbodiimide comprising the reaction product of an isocyanate in the presence of a catalyst; and
    C. an outer layer disposed about said base layer and comprising wax.
2. An encapsulated particle as set forth in claim 1 wherein said isocyanate is reacted in an amount of from about 0.1 to about 10 parts by weight based on 100 parts by weight of said core particle to form said base layer comprising polycarbodiimide.
3. An encapsulated particle as set forth in claim 1 wherein said isocyanate comprises polymeric diphenylmethane diisocyanate having an NCO content of about 31.5 weight percent and/or 4,4'-diphenylmethane diisocyanate having an NCO content of about 33.5 weight percent.
4. An encapsulated particle as set forth in claim 1 further comprising an intermediate layer disposed between said base layer and said outer layer and comprising polycarbodiimide.
5. An encapsulated particle as set forth in claim 1 wherein said wax is present in an amount of from 0.1 to 5 parts by weight based on 100 parts by weight of said core particle.
6. An encapsulated particle as set forth in claim 1 wherein said core particle comprises urea.
7. An encapsulated particle as set forth in claim 6 wherein said core particle has a dissolution of less than 25% by weight after 7 days of aging in a water solution at 38° C.
8. An encapsulated particle as set forth in claim 1 wherein said core particle comprises fertilizer.
9. An encapsulated particle as set forth in claim 1 wherein said catalyst is a phosphorous compound.
10. A method of forming an encapsulated particle, said method comprising the steps of:
    A. reacting an isocyanate in the presence of a catalyst to form polycarbodiimide;
    B. encapsulating a core particle with the polycarbodiimide to form a base layer disposed about the core particle; and
    C. encapsulating the base layer with wax to form an outer layer disposed about the base layer.
11. A method as set forth in claim 10 wherein the isocyanate comprises polymeric diphenylmethane diisocyanate having an NCO content of about 31.5 weight percent and/or 4,4'-diphenylmethane diisocyanate and having an NCO content of about 33.5 weight percent.
12. A method as set forth in claim 10 further comprising the step of heating the core particle to a temperature of greater than 120° F. prior to the step of encapsulating the core particle with the polycarbodiimide to form the base layer.
13. A method as set forth in claim 10 wherein the step of reacting the isocyanate in the presence of the catalyst to form the polycarbodiimide is further defined as heating the isocyanate in the presence of the catalyst to a reaction temperature of greater than 120° F.
14. A method as set forth in claim 10 wherein the step of reacting the isocyanate in the presence of the catalyst to form the polycarbodiimide is conducted simultaneous with the step of encapsulating the core particle with the polycarbodiimide to form the base layer.
15. A method as set forth in claim 10 wherein the steps of reacting an isocyanate in the presence of a catalyst to form a polycarbodiimide and encapsulating the core particle with the polycarbodiimide to form the base layer are conducted in 40 minutes or less.
16. A method as set forth in claim 10 further comprising the steps of reacting a supplemental isocyanate in the presence of a supplemental catalyst to form a supplemental polycarbodiimide, and encapsulating the base layer with the supplemental polycarbodiimide to form an intermediate layer disposed between the base layer and the outer layer.
17. A method as set forth in claim 16 wherein the step of reacting a supplemental isocyanate in the presence of a supplemental catalyst to form a supplemental polycarbodiimide is conducted simultaneous with the step of encapsulating the core particle with the supplemental polycarbodiimide to form the intermediate layer.

18. A method as set forth in claim 10 wherein the isocyanate is reacted in an amount of from 0.1 to 10 parts by weight based on 100 parts by weight of the core particle to form the base layer.

19. A method as set forth in claim 10 wherein the core particle comprises fertilizer.

20. A method as set forth in claim 10 wherein said catalyst is a phosphorous compound.

* * * * *